United States Patent [19]

Downing et al.

[11] Patent Number: 4,689,757

[45] Date of Patent: Aug. 25, 1987

[54] MACHINE EVENT PROCESSING SYSTEM

[75] Inventors: Gene Downing, Riverside; Glen Kozuma, Crestline, both of Calif.

[73] Assignee: Vada Systems, Inc., Riverside, Calif.

[21] Appl. No.: 810,532

[22] Filed: Dec. 17, 1985

Related U.S. Application Data

[63] Continuation of Ser. No. 458,363, Jan. 17, 1983, abandoned.

[51] Int. Cl.[4] .......... G06F 15/20

[52] U.S. Cl. .......... 364/550; 340/347 DD; 364/464; 364/479; 377/13; 377/16

[58] Field of Search .......... 364/464, 479, 550, 551; 377/7, 13, 15, 16; 235/376; 340/347 DD

[56] References Cited

U.S. PATENT DOCUMENTS

| | | | |
|---|---|---|---|
| 3,852,687 | 12/1974 | Hodges | 340/347 DD |
| 3,878,371 | 4/1975 | Burke | 377/16 X |
| 3,934,123 | 1/1976 | Maurer | 377/15 X |
| 4,049,917 | 9/1977 | Copperi et al. | 340/347 DD |
| 4,051,353 | 9/1977 | Lee | 377/7 X |
| 4,090,247 | 5/1978 | Martin | 364/900 |
| 4,216,461 | 8/1980 | Werth et al. | 377/7 X |
| 4,272,757 | 6/1981 | McLaughlin et al. | 377/13 |
| 4,349,913 | 9/1982 | Skoog | 340/347 DD |
| 4,350,238 | 9/1982 | Shah et al. | 377/7 X |
| 4,369,442 | 1/1983 | Werth et al. | 377/7 |
| 4,387,296 | 6/1983 | Newell et al. | 235/376 |
| 4,432,064 | 2/1984 | Barker et al. | 364/550 |

*Primary Examiner*—Errol A. Krass
*Assistant Examiner*—Kevin J. Teska
*Attorney, Agent, or Firm*—Donald D. Mon

[57] ABSTRACT

A system for reading, recording and transferring one or more discrete machine events to computer processing equipment for accounting and tabulation. The system is comprised of a discrete machine event counting module which records and stores a count of machine operation, and can include means for recording the time of some selected event or events. The module also stores an identification code for the particular machine. The module can be connected directly through a microprocessor to a central processing center, or it can be located at a machine or at a group of machines. When located in an individual machine or in a group of machines, and hardwiring to the central processing center is for some reason not desired, then a portable transfer unit can be provided which can be connected to the module to retrieve or to read its contents by applying a read data command signal to the module. The transfer unit can then be transported to access means for the central processing center and the information that was obtained from the module will be transferred to centers for processing and tabulation.

16 Claims, 6 Drawing Figures

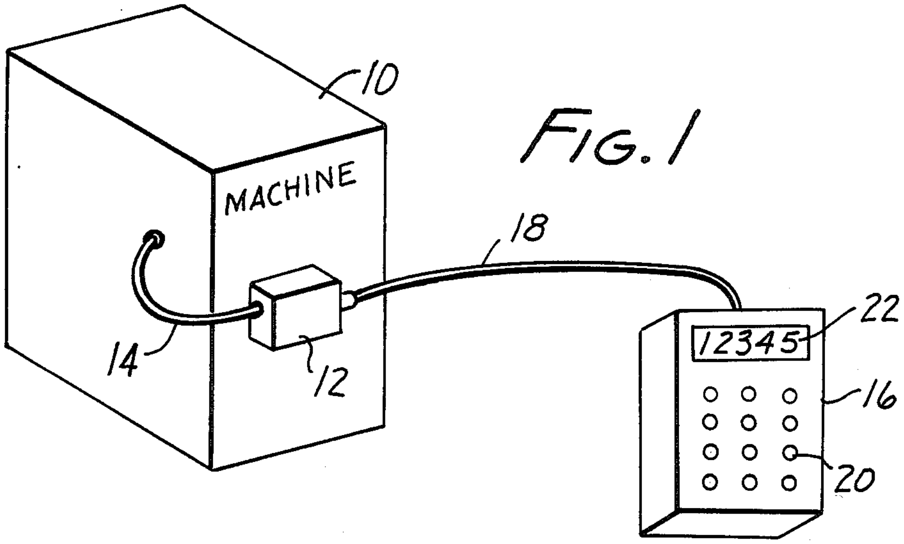
FIG. 1
FIG. 2
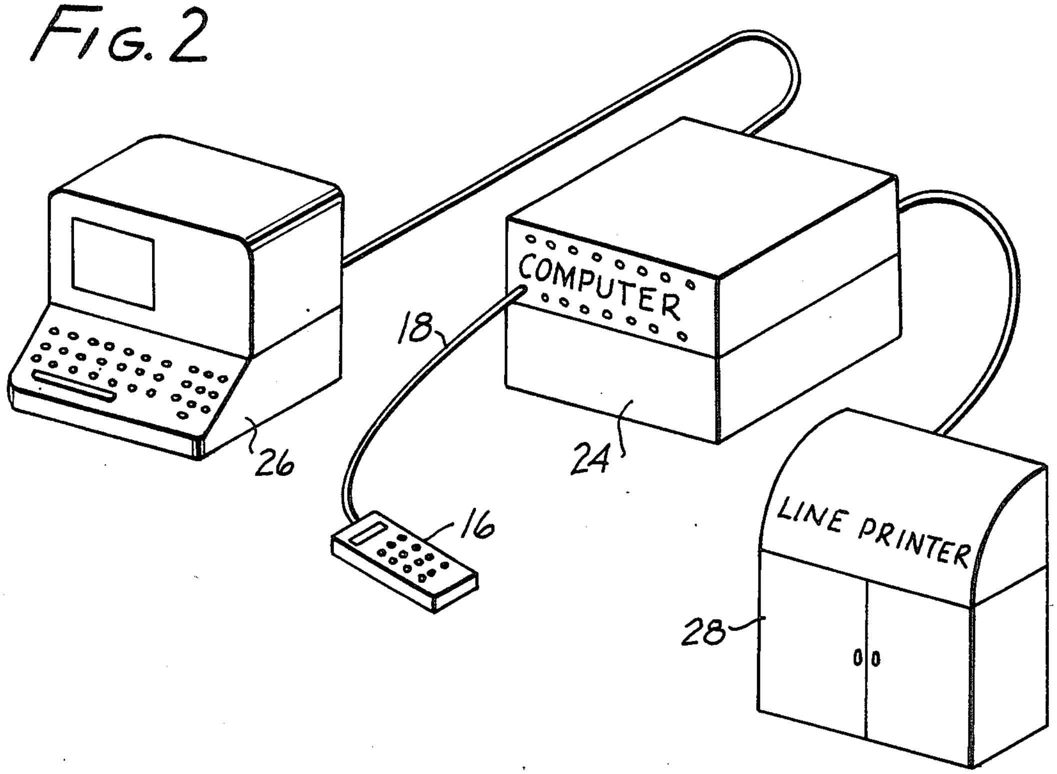

MACHINE EVENT PROCESSING SYSTEM

This is a continuation of co-pending application Ser. No. 458,363, filed on Jan. 17 1983, now abandoned.

FIELD OF THE INVENTION

This invention relates to machine event counting systems, and more particularly relates to a discrete machine event counting system which enables machines events conveniently to be monitored, either directly and continuously, or by intermediate occasional transfer via a portable transfer unit.

BACKGROUND OF THE INVENTION

Presently, coin operated machines such as gaming machines have one or more counters which sequentially count various machine events. The particular events counted may be such as the total number of coins inserted, and the number of coins involved in a given cycle. Counters are also frequently provided to monitor the payout process of the machine, the passage of coins to a 'drop' (profit) unit, and the number of times the door to the machine is opened. Thus, frequency coin machines in which substantial amounts of coins are processed along several internal paths will have a number of individual counters whose counts must be read, recorded and analyzed from time to time. This is usally done by opening the machine and manually recording the readings of the counters. Such manual recording lends itself to numerous errors because the reader may inadvertently incorrectly transcribe the reading, or may fraudulently incorrectly record the readings. Additionally, the need to open the machine to read the counters increases the risk of theft of the coins contained in the machine. For example, in some machines a portion of the machine deposits can be removed and the counter readings can be adjusted to offset for the theft.

An object of the present invention is to provide a machine event reading system which permits easy; tamper-proof transcription of the machine operations and transfer of the data to equipment for processing without compromising the security of the machine, or of its data, or of its contents.

Another object of this invention is to utilize counter means which respond unidirectionally to pulses derived from the occurrence of an event. Thus, the system's readings cannot adjustably be lowered. Its readings are suitable for definitive processing without further treatment in a computer or otherwise.

BRIEF DESCRIPTION OF THE INVENTION

To accomplish the above purposes, a machine event counting module is interfaced with counter means which could form part of the module, or which may already be in a conventional machine, for example an electromechanical counter. The counter means provides a pulse respective to the occurrence of each event. If a counter system is provided as part of the module, the existing machine meter counting system can be left in place to serve as a verification of the accuracy of the electronic module, if desired. Whatever is its source of counts of events, the module counts the designated discrete machine events, and stores the count as accumulated data. The number of counting means is at least equal to the number of machine operations being monitored. That is, if counts inserted and coins paid out are separately counted, then two separate counters would be provided. More counters would be employed if more counting operations or other functions are monitored. The counts are serialized by transferring them to storage circuits such as a shift register, and are stored until they are read or otherwise utilized. The module has for each machine an identification code to identify the machine in which the data was generated.

According to one embodiment of the invention, the module for each machine is directly wired, usually through a microprocessor, to a central processing unit.

According to yet another embodiment of the invention, the modules may be adapted to be individually read at the machine, or at groups of machines. For this purpose, in order to transfer the data to processing equipment, a portable transfer unit is provided which can be connected to the module for retrieving or reading out the stored data. The transfer unit is connected into the module, and by activating a circuit the data is read or "dumped" out into storage units in the transfer unit. The information can be directed by a preprogrammed microprocessor to data storage random access memories which provide sufficient memory to read and store data from as many machines as are desired to be served by a serviceman without visiting a processing center. The transfer unit can also include a digital display and an audio signal to indicate when the count data of a machine has been completely transferred or "dumped".

The transfer unit is later connected to central computer processing equipment for computation and tabulation. The computer can be interfaced with a cathode ray tube control center for reading out individual data, and a line printer can be provided on which the data of each machine can be tabulated and printed. As an alternative, the transfer unit can be provided with a program which will permit any machine reading to be displayed by appropriate manipulations.

The above and other features of the invention will be fully understood from the following detailed description and the accompanying drawings, in which:

BRIEF DESCRIPTION OF THE DRAWINGS.

FIG. 1 is a schematic illustration showing generally the components of a machine events counting module and a transfer unit;

FIG. 2 is a schematic illustration showing the transfer of the data from the transfer unit to a processing system;

DETAILED DESCRIPTION OF THE INVENTION

Figure 3:
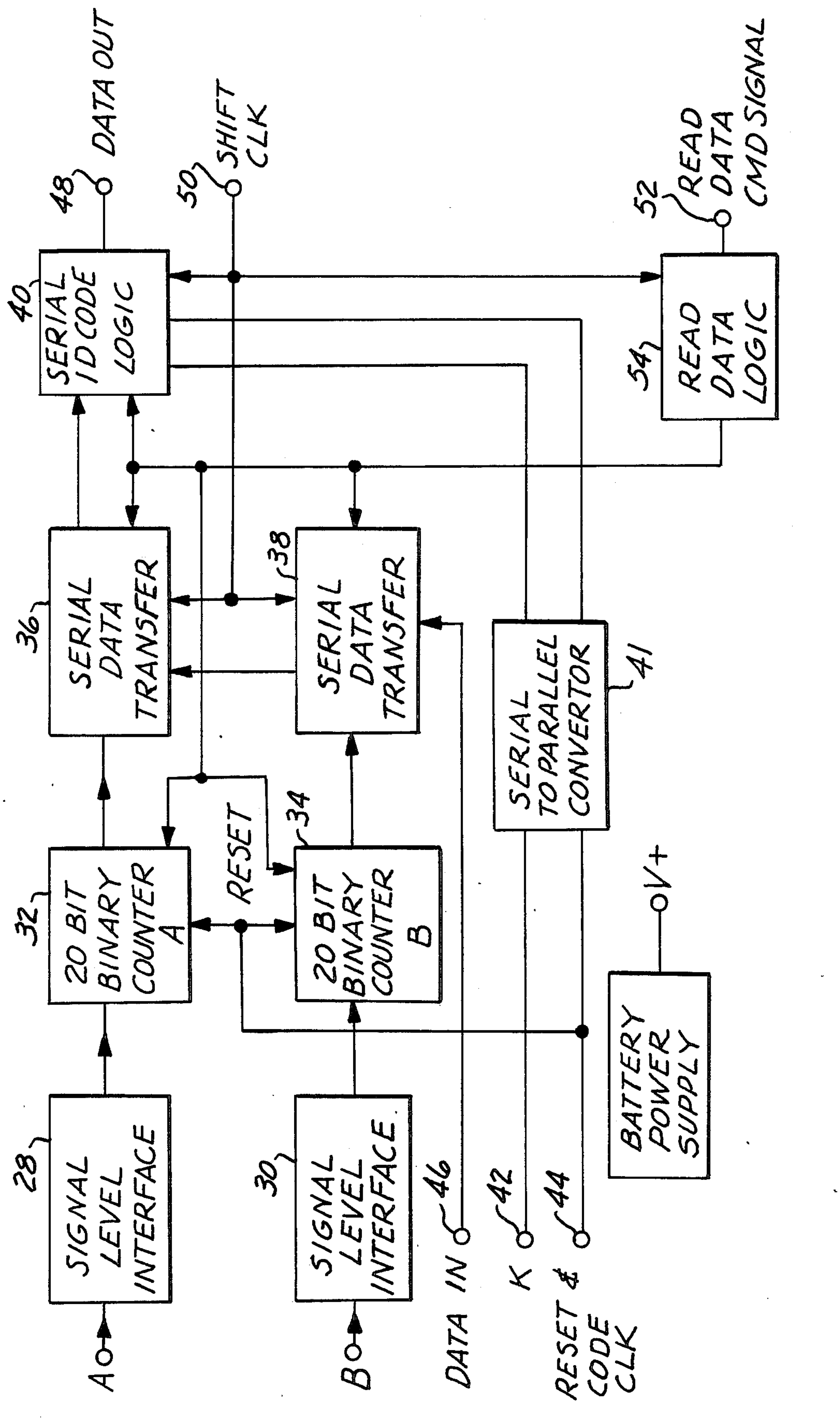
FIG. 3 is a block diagram illustrating the electronic logic of a machine event counting module.

Referring to FIG. 1 a machine 10, which may be any type of coin operated machine such as a gaming machine, a skill machine such as a pinball machine or a video game, or a vending machine, is supplied with a machine event counting module 12 interfaced with or connected to counters in the machine. These counters may be part of the module itself, or they may be the existing mechanical or electrical counters adapted to produce a pulse each time a respective event occurs. For example, the electrical pulse provided in many machines to operate an electromechanical counter can be utilized.

In any event, the module will receive and hold the count. It count unidirectionally, and there is no means to reverse or lower its count without totally and obviously destroying the validity of the data.

Preferably, module 12 will be installed inside the housing of machine 10, with access provided through an external connector. The module could, instead, be mounted to the outside frame of the machine, or event to adjacent structure such as a table or support. Module 12 automatically and continously records one or more selected type of machine events as will be described in greater detail hereinafter. The count of the number of events stored in the module l12 can be read or retrieved at any time by means of a transfer unit 16 which is preferably portable, and in its best mode is of a size that can be carried in the hand. Transfer unit 16 can be connected into the module 12 via a cable 18, utilizing conventional connectors.

In order to read or "dump" the data which is stored in module 12 into transfer unit 16, one of the buttons 20 on the keyboard indicating read or "dump" would be pressed, thereby causing circuit reactions which deliver a binary coded digital (BCD) dump data signal to module 12. The module would then transfer its stored data into transfer unit 16. Completion of transfer is signalled, if desired, by an audible tone and/or by a stop-count on a digital display 22, indicating the end of the read or "dump" operation. Transfer unit 16 may then be disconnected from module 12 by disconnecting cable 18. Transfer unit 16 can be used to read any number of machines up to its maximum storage capabilities.

The information stored in transfer unit 16 may next be transferred to central processing equipment as illustrated in FIG. 2. Transfer unit 16 will be connected into a computer 24 by connecting cable 18. Automatic transfer of the machine event data stored in the transfer unit 16 can be designed to occur as soon as the connection is made, or if preferred, a button on the keyboard on transfer unit 16 can initiate the transfer. The identification code for each machine, which may be in BCD form, and its count or counts will then be transferred to a memory bank in computer 24 for later processing. A conventional processing unit 26 with a keyboard and a cathode ray tube display can be utilized. Processing unit 26 can initiate compilation and tabulation of the data on a line printer 28, if a printout is desired.

The discrete logic used in counting and storing the machine events in module 12 is illustrated in the block diagram of FIG. 3. In this figure it is assumed that there are two machine types of events or operations to be counted and stored. Sometimes only one might be counted. Also, more than two types of events can be monitored by making appropriate modification and cascading of additional counters as necessary. In fact, the time of day of an event, such as the turning on and turning off of the machine could also be monitored, thereby giving information about the employment of the machine. Terminal A, for example, would be connected through a signal level interface 28 to count one machine event, while terminal B would be connected through a signal level interface 30 to count another machine event such as coins received and paid out, respectively. Signal level interfaces 28 and 30 convert an electrical signal supplied as the consequence of an event to drive the conventional electromechanical counter which is frequently provided in machines of this type, to a low level digital signal compatible with discrete logic circuits used in the system. In a conventional machine, an event gives rise to a pulse which actuates the counter to add one count. This pulse can be utilized as a count source by the module. Alternatively, there might be no electromechanical counter, in which case a pulse would be generated for each machine event specifically and only for the module by a built in circuit in which some type of switch would provide the pulse by changing the circuit condition.

Preferably the signal level interfaces will include some type of isolation device to prevent noise transients from interfering with the counting module. Such devices as optical isolators may be used to provide the needed isolation. The signal level interface will serve to convert the machine signals (whatever they are) to a low level input supplied to 20 bit binary counters 32 and 34. The counters will record the number of respective discrete (one-at-a-time) machine events reflected by pulses delivered to terminals A and B which are stored in binary counters 32 and 34. The stored count in the binary counters 32 and 34 (which can only be increased by pulses, and cannot be "adjusted" to a lesser value) will be converted from parallel to serial data by serialized data transfer devices 36 and 38 which, for example, may be serially-connected shift registers. The serializing of data permits the data to be retrieved or read out on a single terminal, minimizing the complexity of the entire system, especially a direct wired system.

The serialized data transfer devices (shift registers) 36 and 38 are connected in series, and are series connected to an ID (identification) code logic circuit 40. The particular identification code entered at terminal 42 (labeled "K") and at terminal 44 to which latter terminal a reset and code clock pulse are applied to serial-to-parallel converter 41, which also may be a shift register. Preferably the terminals 42 and 44 are not externally accessible so that once the identification code for a particular machine has been set it cannot be changed without removing the module from the machine. Signals from terminal 44 also are applied to 20 bit binary counters 32 and 34 to reset them to zero, because it would be difficult to implement a new ID code without disturbing the counts in the counters. Preferably, the ID code is a 24 bit BCD code loaded in on the "key in" terminal 42 by serially clocked pulses applied to terminal 44 allowing many codes to be issued.

Any attempt to change the identification code logic circuit 40 will result in clearing the counts in the counter 32 and 34.

A data-in-terminal 46 is provided for counting additional machine events by cascading of additional counters in the counting module. Thus, the capacity of the counting module can be expanded as needed, depending upon the number of machine events to be monitored. A convenient number of functions in a conventional slot machine, for example, is five. Exemplary machine functions are handle operation, coin(s) in, coins stored in bucket, coins paid out to hopper, and door opened. The latter function is especially useful in small establishments where a key to the machine is left with the proprietor so he can perform minor servicings, because the fact of his access to the coin storage can be an important accounting consideration.

In some circumstances, managers have the surprising tendency to want to shut off the machines during some business hours. This tendency can be frustrated, or at least learned about, by providing a check circuit which records a time reading when some event occurs, such as turning the machine on and off.

A pinball or electronic game machine monitor might usually require only the surveillance of fewer functions, perhaps only two or three. As examples, these could be coin-in and door opened counts and perhaps coins stored in the bucket.

Figure 4:
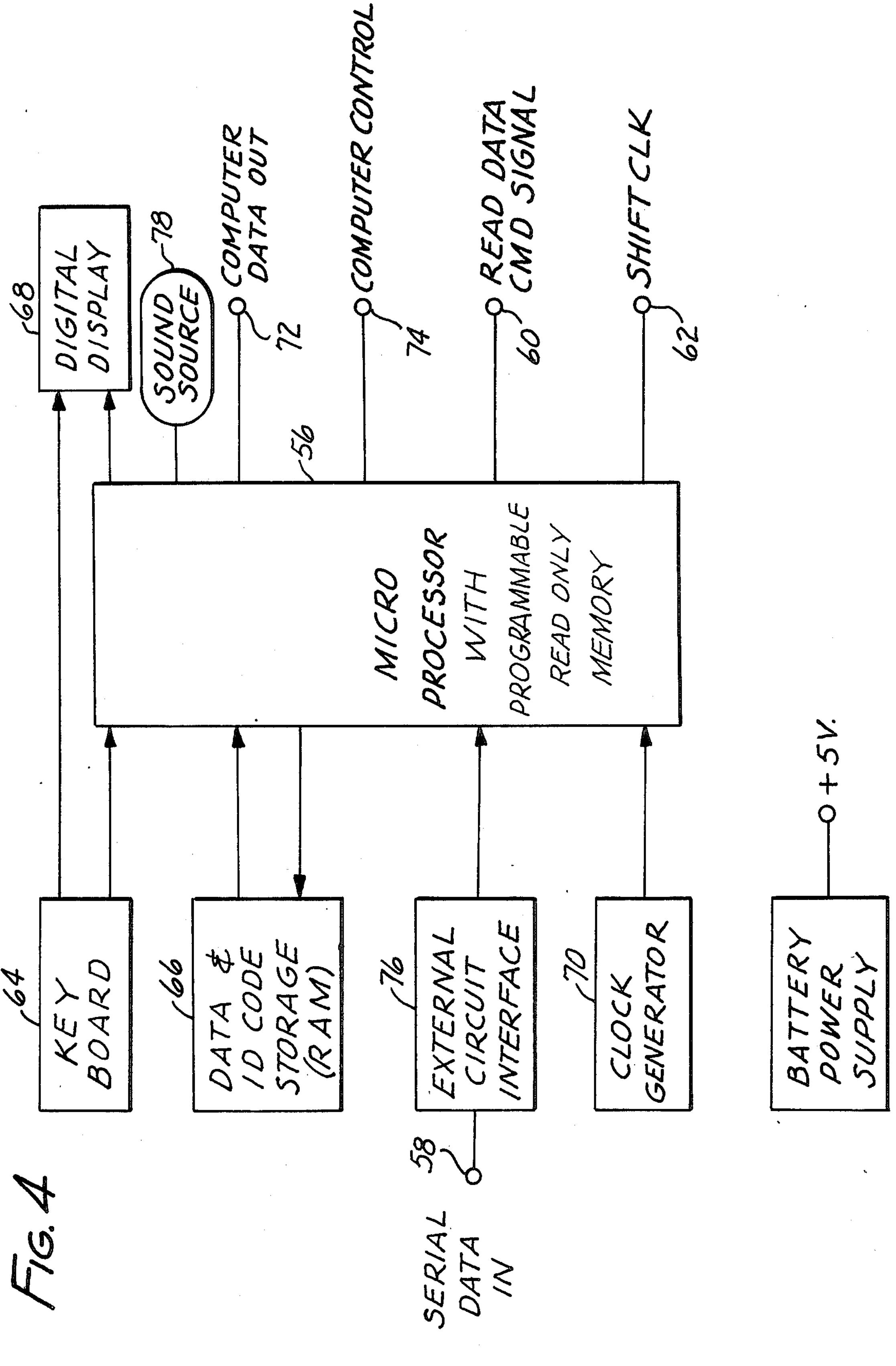
FIG. 4 is a block diagram illustrating the electronic logic of a transfer unit for transferring the data from a module to central processing equipment.

The reading out or retrieval of the data stored in the counting module occurs through terminals 48, 50 and 52. Transfer unit 16 is connected to these terminals by means of a plug on the end of its cable 18 (FIG. 1). Alternatively, the plug can be an integral part of transfer unit 16. When the connection is made with an appropriate connector in the counting module 12, it can automatically activate transfer of the data stored in the counting module. The BCD read data command signal is applied to terminal 52 to activate a read data logic circuit 54 to condition the serialized data storage circuits 36, 38 and 40. Once this is accomplished, clock signals applied to terminal 50 shift out the stored data in modules 36, 38 and 40 bit by bit. The identification code is first shifted out of storage circuit 40 through data output terminal 48 and then the remaining data stored in the shift registers 36 and 38 is sequentially transferred to storage circuits in transfer unit 16. Once the last bit of stored data is transferred, a signal generated in the transfer unit 16 indicates that transfer is completed and the transfer unit may be disconnected. This signal may activate an audible tone and/or show as a stopped count on the digital display. Transfer unit 16 is shown by the logic diagram of FIG. 4. It is comprised of a microprocessor (e.g. a Z-80 microprocessor available from several sources) including a programmable read only memory 56 to produce a BCD read data command signal applied to terminal 52 to activate the read data logic 54 to condition the storage circuits 36, 38 and 40. Simultaneously, the microprocessor circuit 56 delivers synchronized clock pulses from clock generator 70 through terminal 62 to terminal 50 to begin transferring the serialized data from the counter module to the reader unit. Clock signals applied to the terminal 50 shift out the stored data in the modules 36, 38 and 40 bit by bit. The identification code in the first storage circuit 40 is first shifted out of storage through the data output terminal 48 and then the remaining data stored in the counters 32 and 34 is serialized by serial data transfer circuits 36 and 38 and then sequentially transferred to the transfer unit storage circuits. The data is processed through the microprocessor 56 to a plurality of data and ID code storage circuits 66. Once the last bit of stored data is transferred, a signal generated in the transfer unit 16 indicates that transfer is completed and the transfer unit may be disconnected. The signal generated may be in the form of an audible tone and/or a stopped count on a digital display. The storage circuits 66 can have the capacity to store data from as many as 1000 machines with more machine storage possible. Storage memory dictates capacity.

The microprocessor chip (Z-80) is programmed to select one of a number of memory devices in the data and ID code storage random access memory (RAM) 66. The microprocessor can also be programmed to display any discrete machine count by selecting the particular machine ID code on the keyboard which transfers the data from the storage memory 66 to the digital display 68. The programmed microprocessor 56 also delivers clock pulses from the clock generator 70 to the shift clock terminal 62 synchronized with the read data command signal delivered to terminal 60. Terminals 72 and 74 provide connection for data output and computer control to transfer the stored data to data processing equipment. In practice, terminal 74 may comprise several terminals to apply control signals to the computer from the reader for selecting processing of the data from terminal 72. When the transfer unit 16 is connected to a computer, programmed microprocessor 56 can automatically transfer data in the storage circuit 66 into the computer for processing.

The transfer unit, when connected to the counter module, transfers data as was described previously from the data-out terminal to the serial data-in terminal 58, through interface circuit 76 for distribution by programmed microprocessor 56 to storage circuit 66. When data transfer is complete an audible signal from a sound source 78 is produced and/or a stop-count on digital display 68 will be visible. The program in the microprocessor 56 will select and read out identification codes and the machine count for that identification code by manipulation of the keyboard 64, if desired. Alternatively, a simplified transfer unit would only store and transfer data without intermediate reading if desired.

Figure 5:
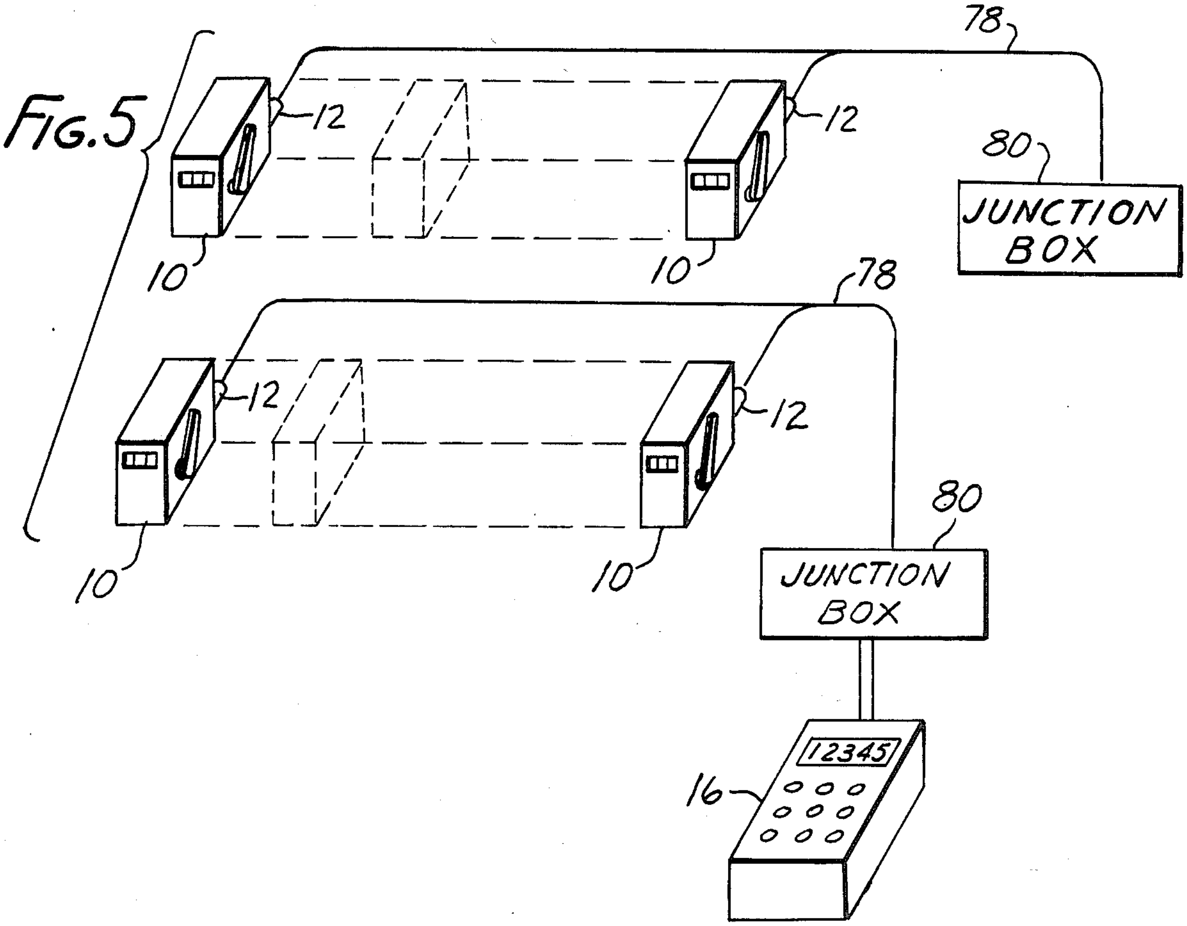
FIG. 5 is a simplified illustration of a multi-machine grouping variation of the invention.

A variation of the invention is illustrated in FIG. 5, in which banks or rows of machines 10 can be ready from a single junction box. Each machne 10 has the storage module 12 for counting various functions as before. However, the storage modules are connected by cable 18 to multi-machine junction boxes 80 at a convenient location such as at the end of each bank or row. Thus, locations with only a few machines can be monitored by a single connection of portable transfer unit 16 to the junction box. The junction box connection can also provide remote reading such as outside an establishment or building, if desired.

Figure 6:
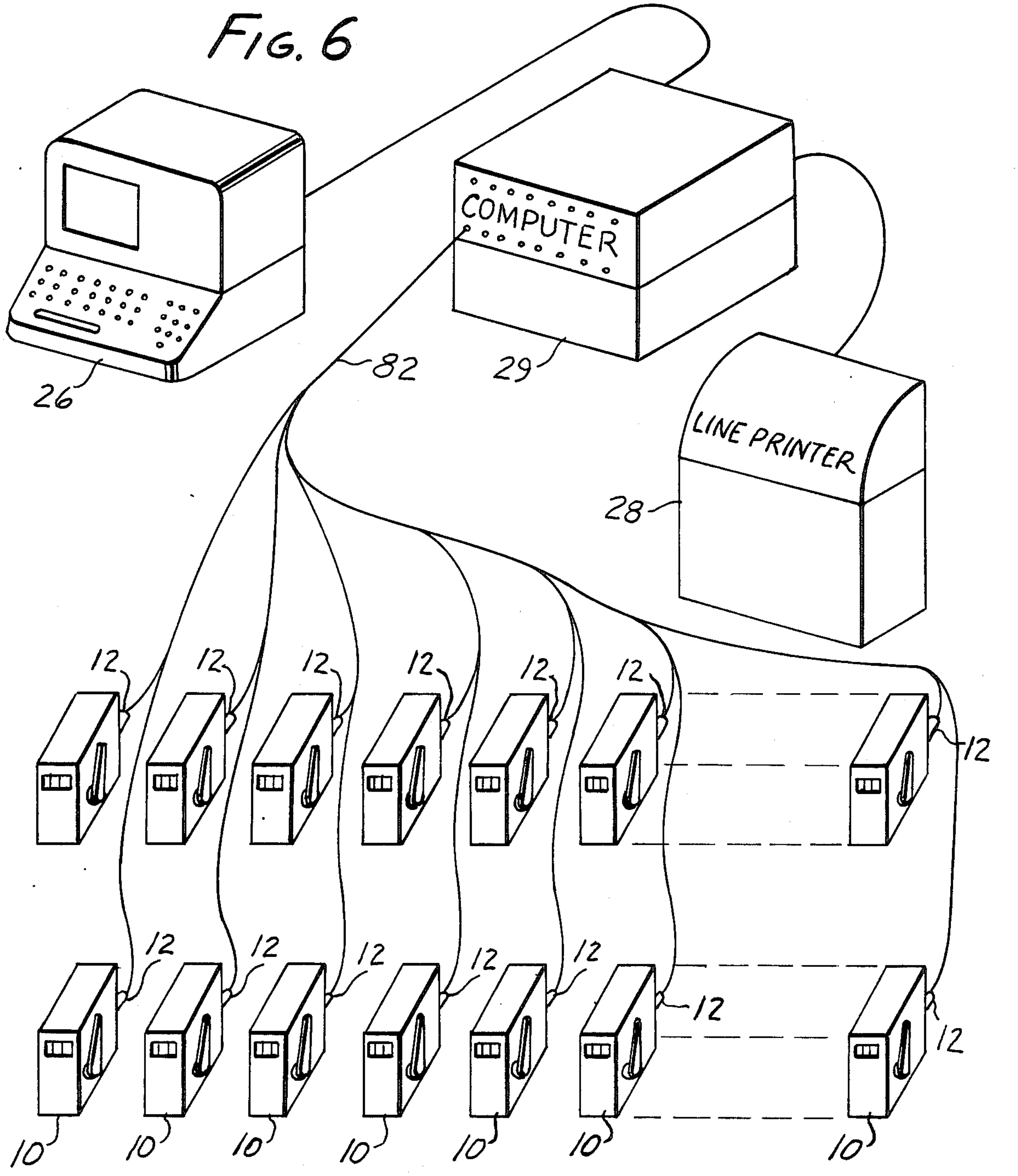
FIG. 6 is a simplified illustration of another variation of the invention in which the machines being monitored are directly connected to a computer processing center.

Alternatively, a large establishment having many hundreds of machines may prefer hardwiring all machines through a microprocessor directly to the computer processing center as shown in FIG. 6. The machines 10 are connected "on-line" by cable 82 directly to a microprocessor interfaced with the computer and can thus be continuously monitored or read-out at will. The storage module 12 can be periodically read automatically or read by simply initiating a transfer function (i.e., BCD dump data code) or read procedure from the central processing center. Thus, a continuous indication of the use, pay out and function of a machine can be provided. The computer can then be programmed to easily spot and indicate machines whose performance is not within normal limits. In this matter, human error and fraud in reading and evaluating coin operated machines can be eliminated or at least its risk greatly reduced.

In each of the embodiments of FIGS. 5 and 6 interrogation or "addressing" of each storage module 12 would be accomplished through a multiplexing and switching circuit. In the embodiment of FIG. 5 the multiplexing circuit would be installed in the junction boxes 80. In the "on-line" system the multiplexer would be located at the central processing center or even built into the computer. The multiplexing and swtiching circuit in junction box 80 by electronic switching permits only one of the count storage modules 12 to react to the BCD dump data signal applied at its input. As an alternative, junction boxes 80 may also be directly hardwired to the computer. This would provide direct reading from the computer or retrieval by transfer unit 16. When all the data is transferred from one module the next dump data signal will be switched to a succeeding storage module 12 to retrieve its data and so on until all the storage modules 12 have been "read".

In practical systems, an installation according to this invention sometimes could differ from the low level nature of the signals that are generated. This is especially the situation when the machine is to be hardwired to a computer that is physically located a substantial distance away from it. Similarily, if a large number of such machines are connected, such a problem can arise, and insufficient signal intensities are generated to enable the system to operate. A suitable means to overcome this problem is, of course, to place an amplifier or repeater in each circuit such as is done in long-distance telephone circuits. However, this proliferation of circuitry is often unnecessary.

Instead, the junction boxes 80 can be provided with means to provide a certain signal of suitable amplitude to the transferent when a transfer unit is 'to be used. Optionally, when the system is to be hardwired (FIG. 6) it is good practice to connect a number of machine units 12 to respective junction boxes and then hardwire these junction boxes to the computer.

In this instance machines would be grouped and connected to junction boxes 80 as shown in FIG. 5 before being routed to the central computer 29. The junction boxes would then, again, have the additional functions of amplification (or amplified repeating) of signals. Then low level signals can effectively be used by circuitry which requires stronger signals for best performance.

Obviously, many modifications and variations of the invention are possible in light of the above teachings. For example, the microprocessor can be programmed to provide various functions in the transfer unit in addition to simply storing and reading out the stored data on command.

This invention is not to be limited by the embodiments shown in the drawings and described in the description, which are given by way of example and not of limitation, but only in accordance with the scope of the appended claims.

I claim:

1. A method of monitoring machine events in a coin operated machine which produces electrical signals upon each occurrence of an event, said method of monitoring machine events comprising;

converting said electrical signals to low level digital signals;

counting said low level signals with parallel binary counting means receiving said low level digital signals to produce data;

converting said data from said parallel binary counting means to serial data by transferring said data to a plurality of serially connected shift registers;

storing said data converted from parallel to serial data form in said plurality of serially connected shift registers;

said steps of counting said low level digital signals, and converting and storing said data comprising unidirectionally and non-destructively counting said low level digital signals, and converting and storing said data in serial data form; and transferring said stored serial data from said plurality of serially connected shift registers to computer processing means.

2. The method according to claim 1 in which said transferring step comprises transferring said serial data to portable data transfer and storage means for subsequent transfer to said computer processing means.

3. The method according to claim 2 including storing a read only identification code in serial form in each of a plurality of machines.

4. The method according to claim 3 including transferring and storing said read only identification code to said portable data transfer and storage means with said stored serial data; whereby said portable data transfer and storage means stores data from a plurality of said coin operated machines with the identification code of the machine the serial data came from for later retrieval.

5. A machine event counting and processing system for a machine having means for generating electrical signals in response to the occurrence of an event, said machine event counting and processing system comprising;

signal converting means receiving and converting said electrical signals generated by a machine event to low level digital signals;

parallel binary counting means receiving outputs from said signal converting means for counting said low level digital signals representing each machine event in parallel data form;

parallel to serial converting means receiving and converting said low level digital signals from said parallel binary counting means from parallel data to serial data;

said parallel to serial converting means including count data storage means receiving and storing said serial data representing each machine event; said count data storage means comprising a plurality of serially connected shift registers receiving and storing the output of said parallel binary counting means;

said parallel binary counting means, count data storage means and parallel to serial converting means configured to count and store said low level digital signals in a unidirectional nondestructive manner;

data transfer means for transferring said stored serial data to computer processing means;

said data transfer means including means for activating said count data storage means for sequentially transferring said stored serial data to said computer processing means;

whereby machine events are counted and nondestructively stored in serial data form for transfer to computer processing means on command.

6. The system according to claim 5 in which said transfer means comprises; portable data transfer means , said portable data transfer means including;

serial storage means for storing digital signals in serial form;

temporary connecting means for temporary connection of said portable data transfer means to said count data storage means;

activating means for activating said count data storage means for sequential transfer of stored digital data to and from said storage means in said portable data transfer means;

whereby data may be transferred to said portable data transfer means for subsequent transfer from said portable data transfer means to computer processing means.

7. The system according to claim 6 including read only means for storing a read only indentification code in said machine, said storing means connected to said count data storage means to be read out therewith.

8. The system according to claim 7 in which said portable data transfer means includes means for storing data from a plurality of machines; said data being sequentially transferred with said machine identification code and stored in said portable data transfer means.

9. The system according to claim 8 in which said means for storing an identification code in said machine comprises a shift register, said shift register being connected in series with said count data storage means; said shift register connected for sequential transfer of said identification code to said portable data transfer means before transfer of said stored data.

10. The system according to claim 9 in which a plurality of said machines are connected to a centrally located junction means whereby said portable data transfer means can simultaneously transfer data from said plurality of machines.

11. The system according to claim 6 in which said activating means comprises shift clock pulse generating means; and read command pulse generating means.

12. The system according to claim 11 in which said portable data transfer means includes display means for displaying the count data being transferred.

13. The system according to claim 12 including means for selectively displaying a machine count in said display means.

14. The system according to claim 13 in which said means for selectively displaying a machine count includes; a keyboard for keying in a machine identification code; and programmable microprocessing means programmed to retrieve and display the count data stored in said storage means when a machine identification code is keyed in.

15. The system according to claim 6 in which said signal converting means includes isolating means isolating said converting means from electrical transients in said machine.

16. The system according to claim 15 in which said isolating means comprises an optical isolator.

* * * * *